(12) United States Patent
Watanabe et al.

(10) Patent No.: US 9,747,933 B1
(45) Date of Patent: Aug. 29, 2017

(54) MAGNETO-RESISTIVE EFFECT ELEMENT HAVING SIDE SHIELD INTEGRATED WITH UPPER SHIELD

(71) Applicant: TDK Corporation, Tokyo (JP)

(72) Inventors: Hisayoshi Watanabe, Tokyo (JP); Naomichi Degawa, Tokyo (JP); Satoshi Miura, Tokyo (JP); Masachika Hashino, Tokyo (JP); Tetsuya Hiraki, Tokyo (JP); Hidekazu Kojima, Tokyo (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 15/044,559

(22) Filed: Feb. 16, 2016

(51) Int. Cl.
*G11B 5/39* (2006.01)

(52) U.S. Cl.
CPC .................. *G11B 5/3912* (2013.01)

(58) Field of Classification Search
CPC .................. G11B 5/3912; G11B 5/39
See application file for complete search history.

(56) References Cited

U.S. PATENT DOCUMENTS

| | | | |
|---|---|---|---|
| 6,335,081 B1 | 1/2002 | Araki et al. | |
| 6,847,510 B2 * | 1/2005 | Childress | B82Y 10/00 257/E43.004 |
| 7,253,994 B2 | 8/2007 | Kagami et al. | |
| 7,692,901 B2 | 4/2010 | Kagami | |
| 7,784,171 B2 * | 8/2010 | Kagami | G11B 5/3906 216/22 |
| 7,961,440 B2 * | 6/2011 | Gill | B82Y 10/00 360/324.11 |
| 8,240,026 B2 | 8/2012 | Kagami et al. | |
| 8,451,567 B2 | 5/2013 | Zhou et al. | |
| 8,507,113 B2 | 8/2013 | Abarra et al. | |
| 8,518,717 B2 | 8/2013 | Zheng et al. | |
| 8,553,369 B2 * | 10/2013 | Song | B82Y 10/00 360/324.12 |
| 8,582,249 B2 * | 11/2013 | Sapozhnikov | G01R 33/093 360/324.11 |
| 8,611,054 B1 | 12/2013 | Shang et al. | |
| 8,675,318 B1 * | 3/2014 | Ho | G11B 5/398 360/324.11 |
| 8,953,285 B2 | 2/2015 | Zhou et al. | |

(Continued)

*Primary Examiner* — Brian Miller
(74) *Attorney, Agent, or Firm* — Posz Law Group, PLC

(57) ABSTRACT

A magneto-resistive effect element (MR element) has an upper shield that is magnetized in a cross track direction, a lower shield that is positioned at an interval relative to the upper shield in a down track direction, and a multilayer film that is positioned between the upper shield and the lower shield and that faces an air bearing surface (ABS). The multilayer film has a free layer where its magnetization direction fluctuates relative to an external magnetic field, a pinned layer where its magnetization direction is pinned against the external magnetic field, a nonmagnetic spacer layer that is positioned between the free layer and the pinned layer, and an insulating layer that is positioned at a back side of the free layer viewed from the ABS. The MR element further has a pair of side shields that are positioned at both sides of the free layer and the insulating layer in a cross track direction. The side shields contact the upper shield on the sides of the free layer and the insulating layer in the cross track direction.

7 Claims, 19 Drawing Sheets

(56) References Cited

U.S. PATENT DOCUMENTS

| | | | | |
|---|---|---|---|---|
| 9,042,062 B2* | 5/2015 | Hong | ............... | H01L 43/02 |
| | | | | 360/319 |
| 9,047,893 B1* | 6/2015 | Gao | ............... | G11B 5/3163 |
| 9,171,559 B1* | 10/2015 | Nikolaev | ............ | G11B 5/3932 |
| 9,305,578 B1* | 4/2016 | Singleton | ............ | G11B 5/3932 |
| 2004/0207960 A1* | 10/2004 | Saito | ............... | G11B 5/3903 |
| | | | | 360/324.1 |
| 2004/0207962 A1* | 10/2004 | Saito | ............... | B82Y 10/00 |
| | | | | 360/324.11 |
| 2005/0270703 A1* | 12/2005 | Hayakawa | ............... | G11B 5/39 |
| | | | | 360/324.1 |
| 2010/0232072 A1* | 9/2010 | Dimitrov | ............... | B82Y 25/00 |
| | | | | 360/319 |
| 2014/0264665 A1 | 9/2014 | Li et al. | | |

* cited by examiner

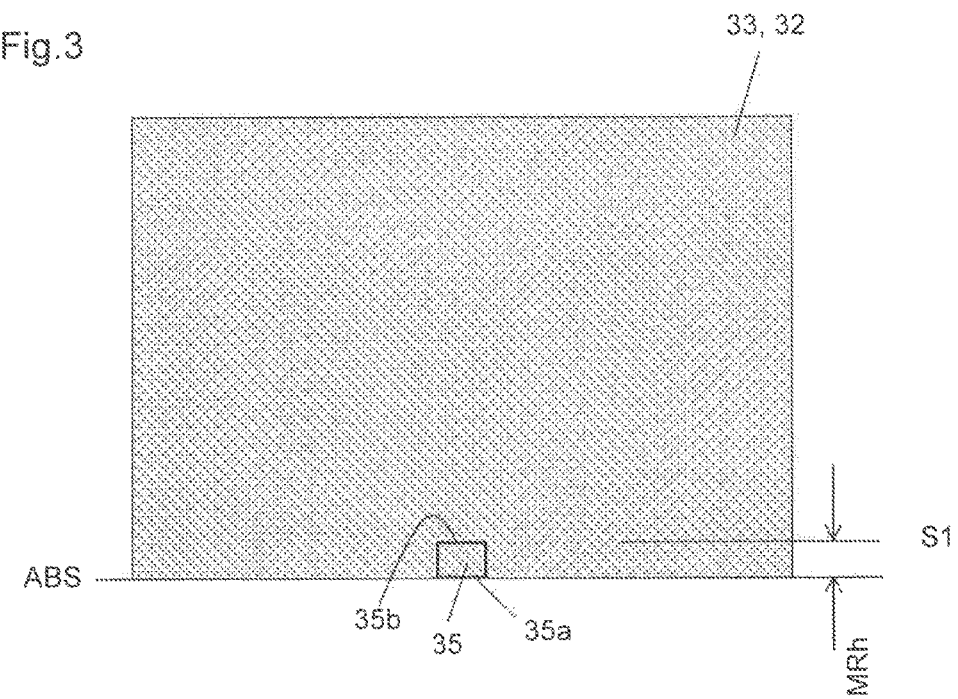
Fig.3
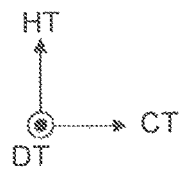

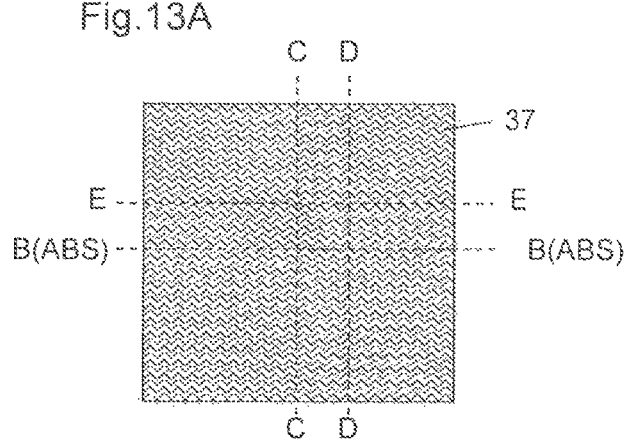
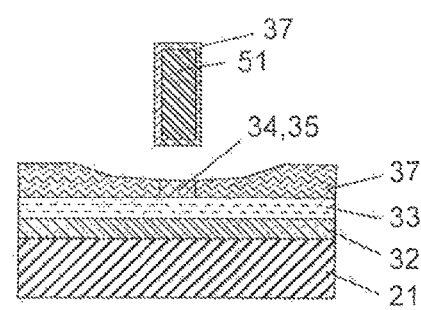
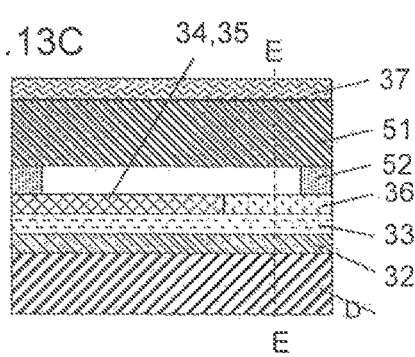
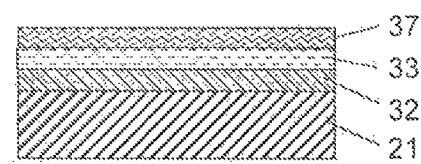
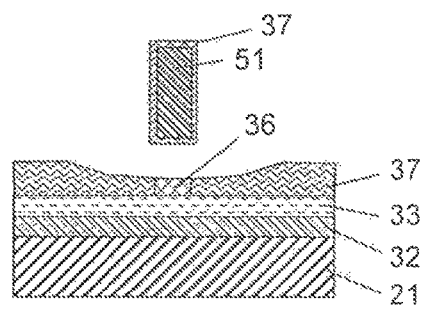

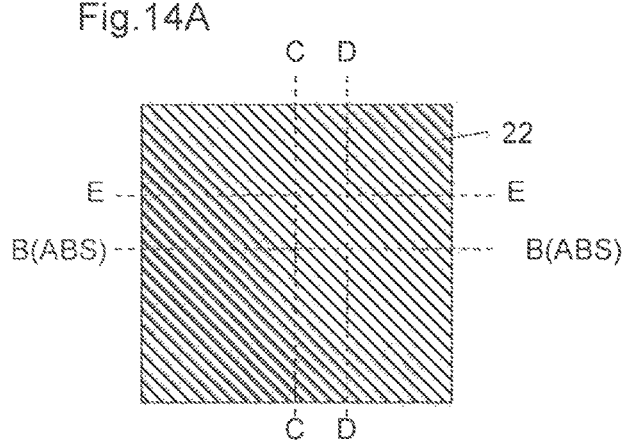
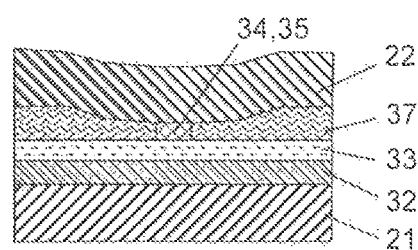
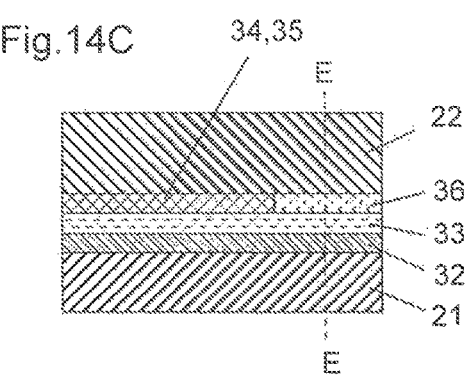
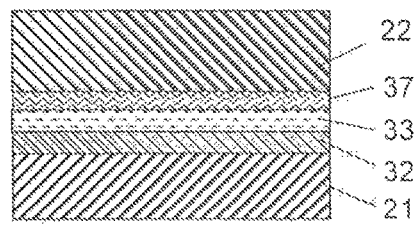
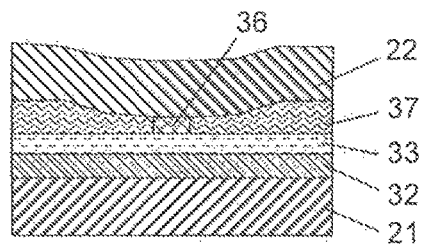

MAGNETO-RESISTIVE EFFECT ELEMENT HAVING SIDE SHIELD INTEGRATED WITH UPPER SHIELD

BACKGROUND OF THE INVENTION

1. Field of the Invention

The present invention relates to a magneto-resistive effect element (MR element), and particularly relates to an MR element where a side shield is magnetically linked with an upper shield.

2. Description of the Related Art

A magneto-resistive effect element (MR element) has a multilayer film indicating a magneto-resistive effect and a pair of magnetic shields that interpose the multilayer film in the down track direction (a track circumferential direction or a lamination direction of the multilayer film). As the multilayer film, a spin-valve film is generally used. The spin-valve film has a free layer where its magnetization direction varies relative to an external magnetic field, a pinned layer where its magnetization direction is pinned against the external magnetic field, and a nonmagnetic spacer layer that is positioned between the free layer and the pinned layer and that generates a magneto-resistive effect. The magnetic shields block a magnetic field that is emitted from a bit, which is adjacent to a bit subject to reading in a recording medium in the down track direction, and functions as an electrode that applies a sense current to the multilayer film.

In general, in a spin-valve type MR element, the magnetization direction of the pinned layer is pinned to a direction that is orthogonal to an air bearing surface (ABS) (hereafter, referred to as the height direction) regardless of whether or not there is any external magnetic field. In the meantime, the magnetization direction of the free layer is designed to be oriented in a cross track direction (a direction that is orthogonal to the down track direction and the height direction) that is orthogonal to that of the pinned layer when no external magnetic field exists. In order to apply magnetization in such a direction to the free layer, a pair of bias magnetic field application layers that apply a bias magnetic field to the free layer are disposed on both sides of the free layer in the cross track direction.

The bias magnetic field application layer is generally formed with an antiferromagnetic layer, but a bias magnetic field application layer formed with a soft magnetic layer is disclosed in U.S. Pat. No. 7,692,901. The bias magnetic field application layer formed with a soft magnetic layer functions as a shield in the cross track direction, and blocks magnetic fields that are emitted from a bit which is adjacent to a bit subject to reading in a recording medium in the cross track direction. Consequently, it is easier to enhance recording density in the cross track direction. In order to allow the soft magnetic layer to function as a bias magnetic field application layer, the upper shield is magnetized in the cross track direction and the bias magnetic field application layer is magnetically linked with the upper shield. Such a bias magnetic field application layer is also referred to as a side shield or a junction shield.

Further it is anticipated that the characteristics of the MR element can be improved by further stabilizing the magnetization of the side shield.

Therefore, the objective of the present invention is to provide a magneto-resistive effect element where magnetization of the side shield is further stabilized.

SUMMARY OF THE INVENTION

The magneto-resistive effect element (MR element) of the present invention has an upper shield that is magnetized in a cross track direction, a lower shield that is positioned at an interval in a down track direction relative to the upper shield, and a multilayer film that is positioned between the upper shield and the lower shield and that faces an air bearing surface (ABS). The multilayer film has a free layer having a magnetization direction that fluctuates relative to an external magnetic field, a pinned layer having a magnetization direction that is pinned against the external magnetic field, a nonmagnetic spacer layer positioned between the free layer and the pinned layer, and an insulating layer that is positioned on the back side of the free layer viewed from the ABS. The MR element further has a pair of side shields positioned on both sides of the free layer and the insulating layer in the cross track direction. The side shields contact the upper shield on the sides of the free layer and the insulating layer in the cross track direction.

The side shields contact not only the side of the free layer in the cross track direction, but also the side of the insulating layer in the cross track direction. Consequently, the side shields are magnetically well coupled with the upper shield magnetized in the cross track direction, stabilizing the magnetization in the cross track direction.

The above mentioned and other objectives, characteristics and advantages of the present invention will become clear from the explanations below with reference to the attached drawings where the present invention is illustrated.

BRIEF DESCRIPTION OF THE DRAWINGS

FIG. 3 is a plan view of a pinned layer and an antiferromagnetic layer of the MR element shown in FIG. 2;

FIGS. 10 to 14E are conceptual views showing the manufacturing process of the MR element relating to the first embodiment;

DETAILED DESCRIPTION OF THE INVENTION

Embodiments of a magneto-resistive effect element (MR element) relating to some embodiments of the present invention and a magnetic head slider using the MR element are explained with reference to the drawings.

(First Embodiment)

Figure 1:
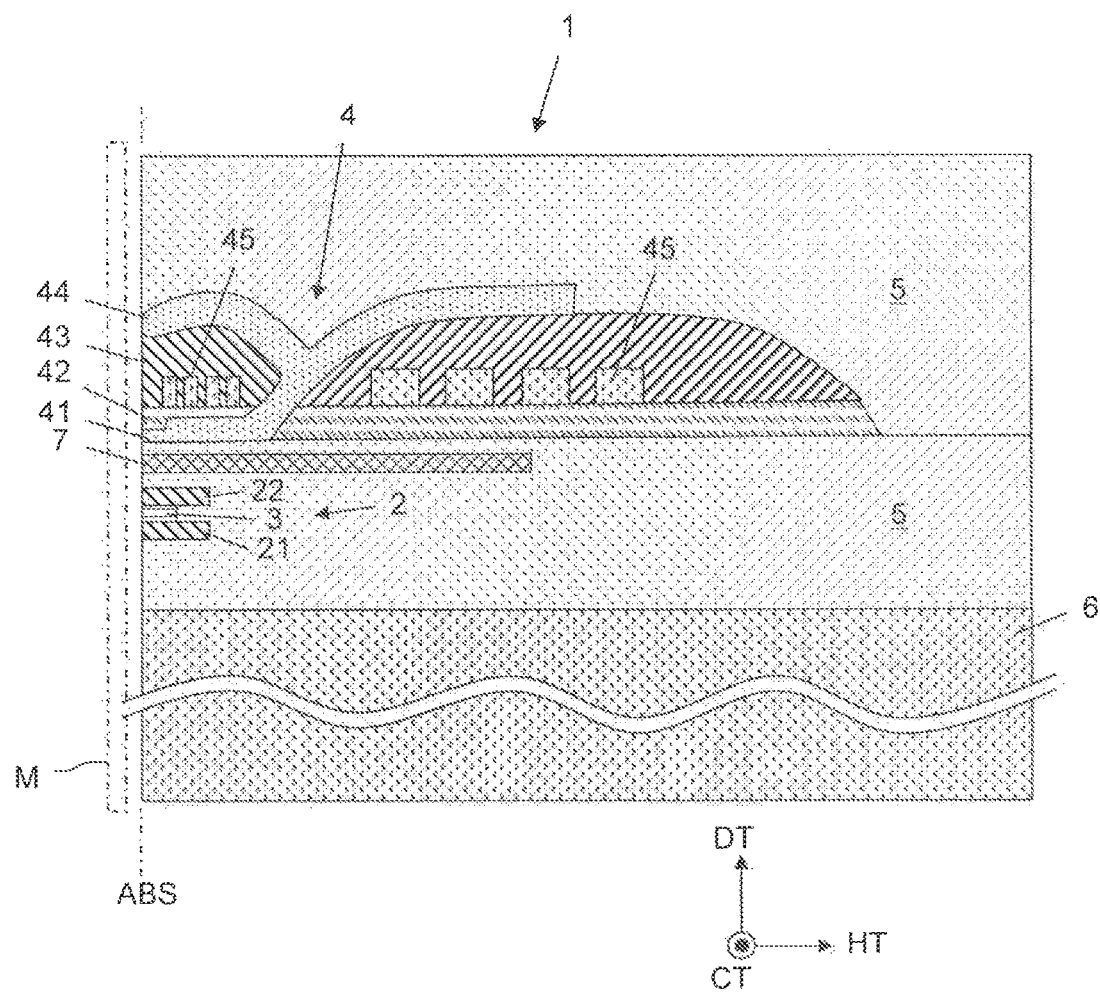
FIG. 1 is a schematic cross-sectional view of a magnetic head slider relating to one embodiment of the present invention.

FIG. 1 shows the main portion sectional view of a magnetic head slider 1 relating to the first embodiment. Magnetic head slider 1 has a substrate 6, a magneto-resistive effect element (MR element) 2 formed above the substrate 6 and a recording part 4 formed above the substrate 6. An air bearing surface (hereafter, referred to as ABS) is a surface of the magnetic head slider 1 opposing the magnetic recording medium (hard disk) M. In the present embodiment, the MR element 2 is positioned between the substrate 6 and the recording part 4, but the recording part 4 can be positioned between the substrate 6 and the MR element 2.

The MR element 2 has a lower shield 21 and an upper shield 22 positioned at intervals relative to the down track direction DT, and a spin-valve type multilayer film 3 positioned between the lower shield 21 and the upper side shield 22. The multilayer film 3 is exposed at the ABS, and configures a part of the ABS. As described in detail hereafter, the upper shield 22 is magnetized in the cross track direction CT. The lower shield 21 is closer to the substrate 6 than the upper shield 22. The lower shield 21 and the upper shield 22 block a magnetic field that is emitted from a bit which is adjacent in the down track direction to a bit subject to reading in a magnetic recording medium M.

The recording part 4 is disposed over the MR element 2 via an inter-element shield 7 formed using the sputtering method. The recording part 4 is configured for so-called perpendicular magnetic recording. A magnetic pole layer for writing is composed of a main magnetic pole layer 41 and an auxiliary magnetic pole layer 44. The magnetic pole layers are formed using the frame plating method. The main magnetic pole layer 41 is formed of an alloy made from two or three of Ni, Fe and Co, and extends in the height direction HT. A coil layer 45 extending above a gap layer 42 made of an insulating material is wound around the periphery of the main magnetic pole layer 41. The coil layer 45 is formed using the frame plating method. Magnetic flux is induced to the main magnetic pole layer 41 by the coil layer 45. The magnetic flux is directed inside of the main magnetic pole layer 41, and is discharged toward the magnetic recording medium M from the ABS. The auxiliary magnetic pole layer 44 is a magnetic layer that is magnetically coupled with the main magnetic pole layer 41. The auxiliary magnetic pole layer 44 is formed from an alloy made from two or three of Ni, Fe and Co. The auxiliary magnetic pole layer 44 is disposed by branching from the main magnetic pole layer 41, and is opposed to the main magnetic pole layer 41 on the ABS via the gap layer 42 and the coil insulating layer 43.

The configuration of the MR element 2 is now explained with reference to FIG. 2. The multilayer film 3 has a free layer 35 where its magnetization direction fluctuates relative to the external magnetic field, a pinned layer 33 where its magnetization direction is pinned against external magnetization, and a spacer layer 34 positioned between the free layer 35 and the pinned layer 33. An insulating layer 36 is disposed at the back side of the free layer 35 viewed from the ABS at the front side of the drawing. The insulating layer 36 is formed of $AlO_3$, $SiO_2$ or the like. A protective layer (not shown) for protecting the multilayer film 3 is formed between the free layer 35 and the upper shield 22. The protective layer is formed with a single layer film of Ru or Ta, or with a two-layer film of Ru and Ta. The free layer 35 is positioned closer to the upper shield 22 than the pinned layer 33. The free layer 35 is made from CoFe, and may contain Ni. The spacer layer 34 can be formed with various nonmagnetic layers, such as copper, aluminum oxide, gallium oxide, magnesium oxide or zinc oxide, providing a magneto-resistive effect.

The pinned layer 33 is formed with an inner pinned layer 33c, an outer pinned layer 33a, an exchange-coupled layer 33b. The inner pinned layer 33c is positioned so as to contact the spacer layer 34. The outer pinned layer 33a is positioned closer to the lower shield 21 than the inner pinned layer 33c. The outer pinned layer 33a and the inner pinned layer 33c are made from CoFe, and may contain Ni. The exchange-coupled layer 33b is disposed between the inner pinned layer 33c and the outer pinned layer 33a, and exchange-couples the inner pinned layer 33c with the outer pinned layer 33a. The exchange-coupled layer 33b is formed with an Ru layer with approximately 0.8 nm of film thickness. The magnetization direction of the inner pinned layer 33c is pinned to the antiparallel orientation of the magnetization direction of the outer pinned layer 33a by the exchange-coupled layer 33b.

The multilayer film 3 further has an antiferromagnetic layer 32 that is positioned closer to the lower shield 21 than the outer pinned layer 33a and that is exchange-coupled with the outer pinned layer 33a. The antiferromagnetic layer 32 contacts the pinned layer 33 on the opposite side of the spacer layer 34. The antiferromagnetic layer 32 is formed from IrMn, and is magnetized in the cross track direction CT. The antiferromagnetic layer 32 can be formed of any of FeMn, NiMn, PtMn or PdPtMn, as well. The antiferromagnetic layer 32 is exposed on the ABS, and configures a portion of the ABS. The antiferromagnetic layer 32 contacts the outer pinned layer 33a, and magnetizes the outer pinned layer 33a in the height direction HT. A seed layer 31 is disposed between the antiferromagnetic layer 32 and the lower shield 21. The seed layer 31 is made from a two-layer film of an Ru layer contacting the lower shield 21 and a Ta layer contacting the antiferromagnetic layer 32. The seed layer 31 is disposed so as to obtain excellent exchange-coupling between the antiferromagnetic layer 32 and the outer pinned layer 33a to be laminated on the seed layer 31.

The shapes of the free layer 35, the pinned layer 33 and the antiferromagnetic layer 32 are further explained with reference to FIG. 3. FIG. 3 is a plan view of the free layer 35, the pinned layer 33 and the antiferromagnetic layer 32 viewed from the upper shield 22 side in the down track direction DT. In order to specify the range of the pinned layer 33, the free layer 35 is illustrated only with a visible outline. The inner pinned layer 33c, the exchange-coupled layer 32b and the outer pinned layer 33a configuring the pinned layer 33 all have the same shape. The antiferromagnetic layer 32 has the same rectangular shape as the pinned layer 33 within a plane determined by the cross track direction CT and the height direction HT, and is formed in the same position as the pinned layer 33 viewed from the down track direction DT. Therefore, in FIG. 3, the ranges of the pinned layer 33 and the antiferromagnetic layer 32 completely match. The spacer layer 34 not shown in FIG. 3 has the same shape as the free layer 35, and is formed in the same position as the free layer 35 viewed from the down track direction DT. Therefore, in FIG. 3, the ranges of the free layer 35 and the spacer layer 34 completely match. In the explanation below, the height of the free layer 35 in the height direction HT, i.e., the distance between the surface 35a of the free layer 35 at the ABS side and the back surface 35b of the surface 35a relative to the height direction HT is referred to as MRh. Further, a surface that is at the equal distance from the ABS as MRh in the height direction HT is referred to as the first surface S1.

The pinned layer 33 and the antiferromagnetic layer 32 have greater length in the height direction HT than the free layer 35. In other words, the pinned layer 33 and the antiferromagnetic layer 32 extend in the height direction HT beyond the first surface S1 viewed from the ABS. Further, the pinned layer 33 and the antiferromagnetic layer 32 have greater length in the cross track direction CT and the height direction HT than the free layer 35. Since the pinned layer 33 contacts the antiferromagnetic layer 32 over a large area, the magnetization direction is solidly pinned by the antiferromagnetic layer 32, lowering the possibility of the magnetization direction reversing.

The lower shield 21 is formed of, for example, NiFe (permalloy). The upper shield 22 is composed of a soft magnetic layer 23 and an anisotropy application layer 24 that gives anisotropy to the soft magnetic layer 23. The anisotropy application layer 24 is positioned on the opposite side of the multilayer film 3 across the soft magnetic layer 23. The soft magnetic layer 23 is formed of, for example, NiFe, and the anisotropy application layer 24 can be formed from an antiferromagnetic body, such as IrMn, PtMn, RuRhMn or FeMn. The anisotropy application layer 24 can also be formed of a hard magnetic body, such as CoPT, CoCrPt or FePt. The soft magnetic layer 23 is exchange-coupled with the anisotropy application layer 24, and is magnetized in the cross track direction CT.

A pair of side shields 37 are disposed on both sides of the free layer 35 and the insulating layer 36 in the cross track direction CT. The side shields 37 are disposed not only on the sides of the free layer 35 in the cross track direction CT, but also on the sides of the insulating layer 36 in the cross track direction CT. The side shields 37 are formed of a soft magnetic body, such as NiFe. The side shields 37 block an external magnetic field that is emitted from a bit adjacent in the cross track direction CT to the bit subject to reading in the magnetic recording medium M, and the free layer 35 is designed to detect only the magnetic field that is emitted from the bit subject to reading. Therefore, the side shields 37 can reduce effective track width, preventing side lobes (a phenomenon generating a local maximum point of an output at a position away from the track center in the cross track direction CT).

Consequently, the free layer 35 is blocked on both sides in the down track direction DT by the upper shield 22 and the lower shield 21, and is blocked on both sides in the cross track direction CT by the pair of side shields 37. Therefore, information that is recorded in the magnetic recording medium M in the down track direction DT and the cross track direction CT with high density can be easily read.

The side shields 37 contact the soft magnetic layer 23 of the upper shield 22. Consequently, the side shields 37 are magnetized in the same direction as the soft magnetic layer 23. The side shields 37 contact the upper shield 22 not only at the side of the free layer 35 in the cross track direction CT, but also at the side of the insulating layer 36 in the cross track direction CT. Therefore, the side shields 37 contact the soft magnetic layer 23 in a wider range, and are solidly and stably magnetized in the cross track direction CT. As a result, characteristics, such as linearity of a readout signal of the MR element 2, tolerability to reversal of the pinned layer in the magnetization direction, and tolerability to an external magnetic field of the MR element 2, can be improved. The side shields 37 apply a bias magnetic field in the cross track direction CT to the free layer 35, and uniformly magnetize the free layer 35 in a single direction. When there is no external magnetic field, the magnetization direction of the free layer 35 is orientated in the cross track direction CT by a bias magnetic field.

The lower shield 21 and the upper shield 22 function as electrodes to supply a sense current to the multilayer film 3. A sense current flows into the multilayer film 3 due to voltage applied between the lower shield 21 and the upper shield 22. An insulating film (not shown) for preventing bypass of the sense current is disposed between the side shields 37 and the multilayer film 3. When the external magnetic field emitted from the magnetic recording medium M is applied to the free layer 35, the magnetization direction of the free layer 35 rotates within the plane of the free layer in a predetermined direction by a predetermined angle, according to the orientation and intensity of the external magnetic field. The magnetization direction of the free layer 35 forms a relative angle according to the orientation and intensity of the external magnetic field relative to the magnetization direction of the inner pinned layer 33c, spin-dependent scattering of conductive electrons vary according to the relative angle and magneto-resistive change occurs. The magnetic field from the magnetic recording medium M in a position opposing the free layer 35 varies as the magnetic recording medium M rotates. The change in the magnetic field is detected as a change in the electrical resistance of the sense current based upon the magneto-resistive effect. The MR element 2 reads magnetic information written into the magnetic recording medium M by using this principle.

Next, a method for making the multilayer film 3 is described.

Figure 2:
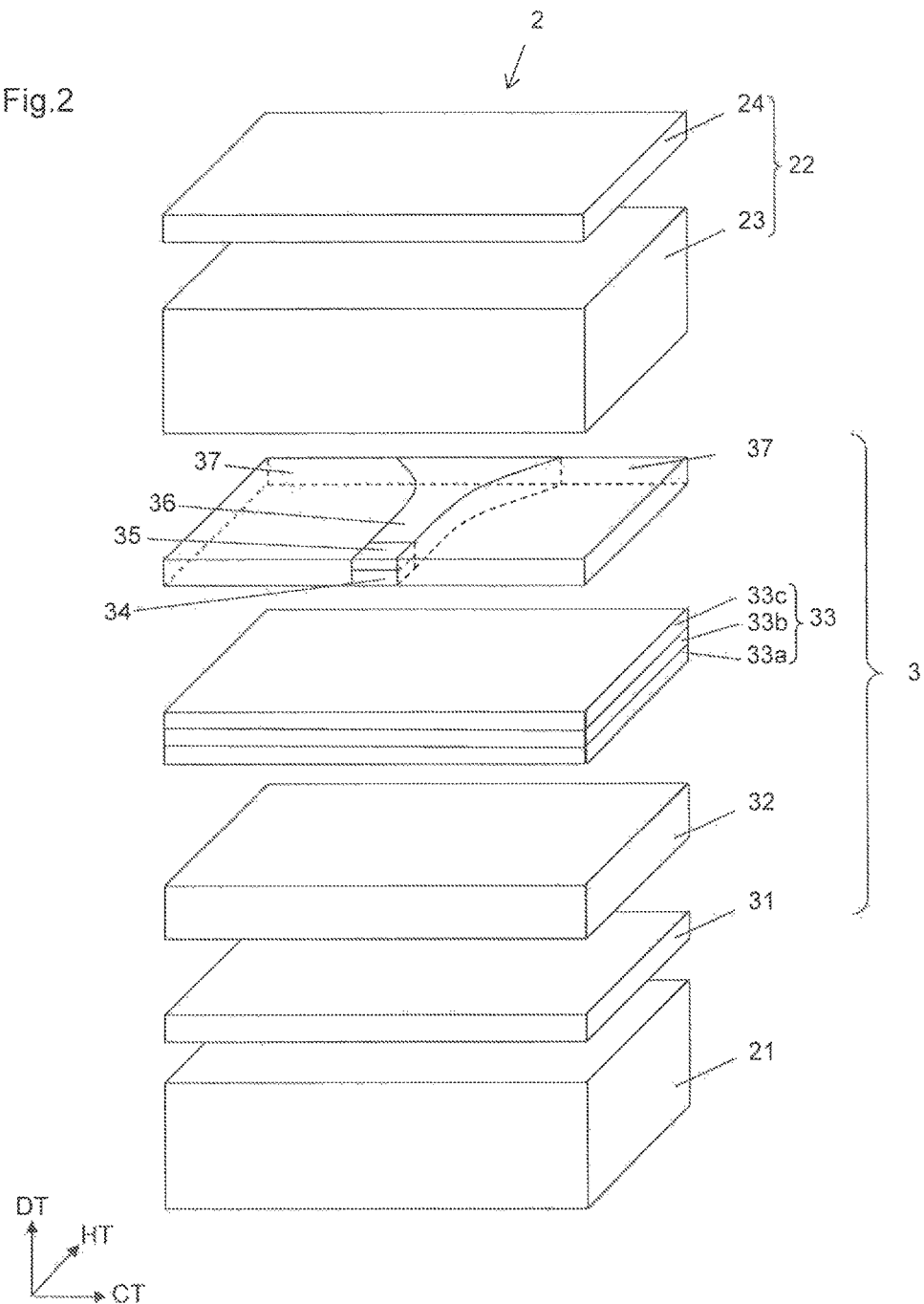
FIG. 2 is a perspective view of a magneto-resistive effect element (MR element) relating to the first embodiment.

At first, as shown in FIG. 2, the lower shield 21 is made using a plating method, and the seed layer 31, the antiferromagnetic layer 32 and the pinned layer 33 (the outer pinned layer 33a, the exchange-coupled layer 33b and the inner-pinned layer 33c) are sequentially formed on the lower shield 21 using the sputtering method. In addition, the spacer layer 34 and the free layer 35 are formed within the same range as the pinned layer 33 using the sputtering method.

Figure 10:
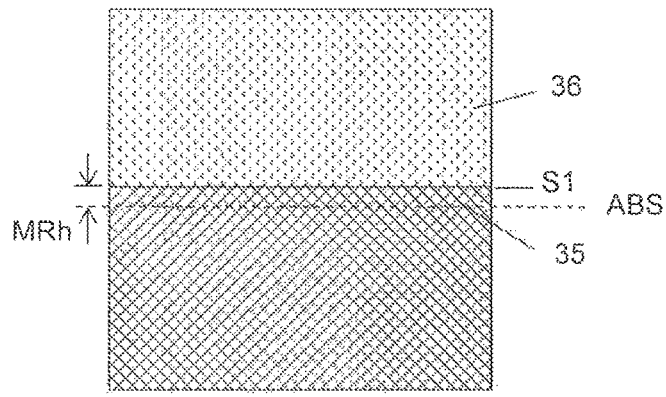

Next, MRh of the free layer 35 is formed, and the insulating layer 36 is formed on the back surface of the free layer 35. FIG. 10 is a magnified plan view of a portion of a wafer, and corresponds to a range of making of the magnetic head slider 1. In the drawing, the upper side of the ABS is a portion which becomes the magnetic head slider 1, and the lower side is a boundary portion with the adjacent magnetic head slider 1. Individual magnetic head sliders 1 are clipped out by cutting a wafer at the boundary, thereby forming the ABS of the magnetic head slider 1. The explanation hereafter is mainly for the upper side of the ABS. First, the range from the first surface S1 of the free layer 35 to the ABS side is covered with a resist. Next, portions of the free layer 35 and the spacer layer 34 that are not covered with the resist are removed by milling, exposing the pinned layer 33. Next, the insulating film 36 is formed on the resist and the exposed pinned layer 33 using the sputtering method. Then, the resist is removed. As shown in FIG. 10, MRh of the free layer 35 is formed by this process (see FIG. 11C, as well) and the insulating layer 36 is formed on the back surface of the free layer 35 viewed from the ABS.

Figure 11A:
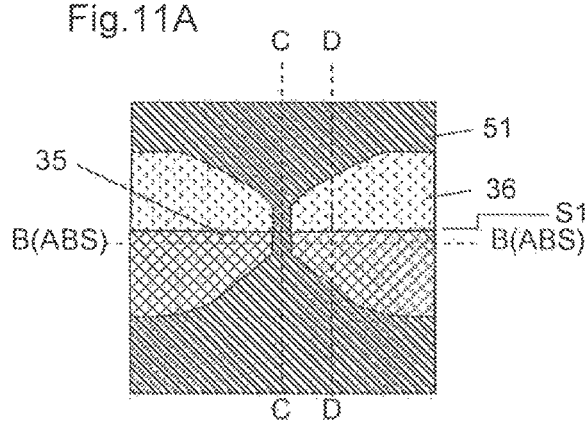
Figure 11B:
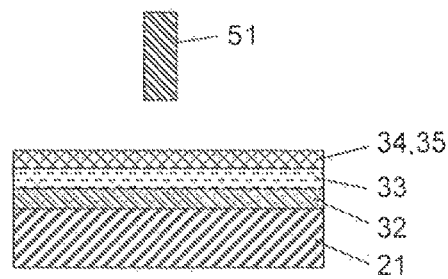
Figure 11C:
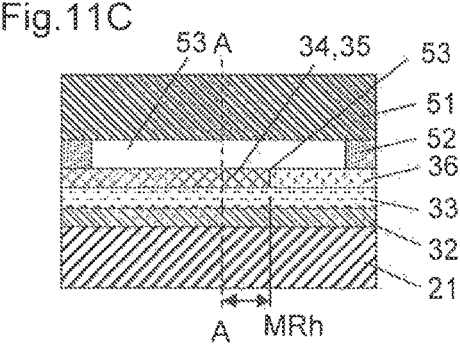
Figure 11D:
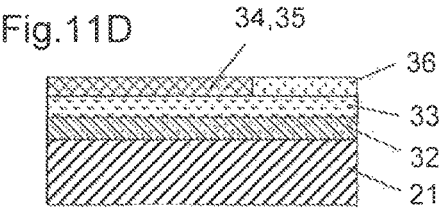

Next, the cross track direction length Tw of the free layer 35 is shaped, along with the insulating layer 36. First, as shown in FIG. 11A, a resist 51 is formed on the free layer 35 and the insulating layer 36. FIG. 11A is a plan view similar to FIG. 10. The resist 51 has the shape that matches the final shape of the free layer 35, the spacer layer 34 and the insulating layer 36, and the cross track direction length of the resist 51 is gradually increased to the direction away from the ABS in the height direction HT. FIGS. 11B, 11C and 11D are cross-sectional views along the line B-B, the line C-C and the line D-D of FIG. 11A, respectively. The line-B-B matches the ABS. The line C-C is a line that passes through the center of the free layer 35 in connection with the cross track direction CT, and the line D-D offsets the line C-C in the cross track direction CT. The line A-A of FIG. 11C indicates the ABS. The resist 51 is formed on the resist 52, and a void 53 is arranged between the free layer 35 and the insulating layer 36 by the resist 52.

Figure 12A:
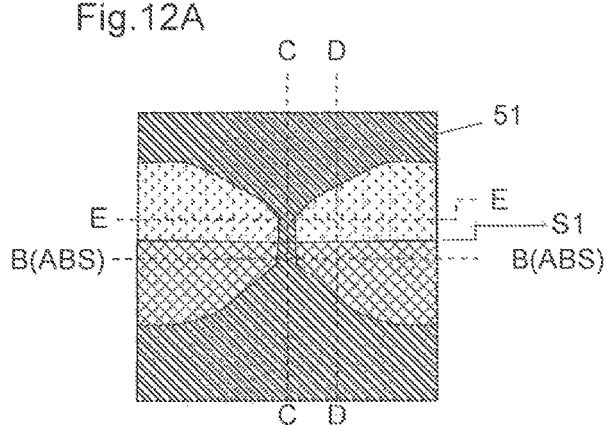
Figure 12B:
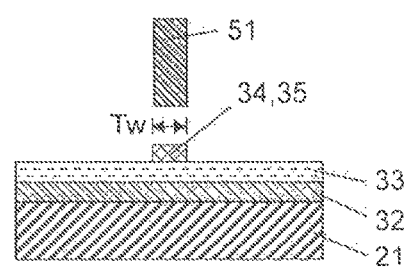
Figure 12C:
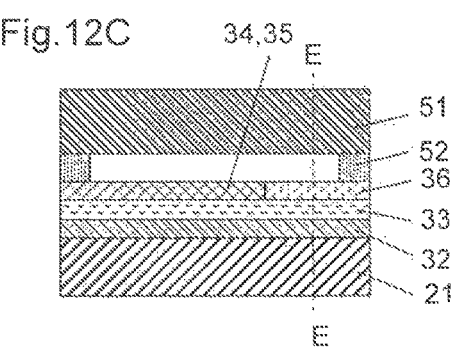
Figure 12D:
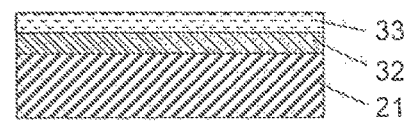
Figure 12E:
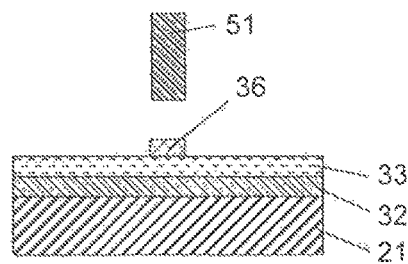

Next, as shown in FIGS. 12A to 12E, the cross track direction length Tw of the free layer 35 and the spacer 34 is shaped by milling, thereby molding the insulating layer 36. FIGS. 12A to 12D are drawings similar to FIGS. 11A to 11D, respectively. FIG. 12E is a cross-sectional view along the line E-E of FIGS. 12A and 12C, and indicates a cross section of the insulating layer 36 behind the free layer 35. The portions of the free layer 35 and the spacer layer 34 that are not covered with the resist 51 are removed, and the cross track direction length Tw is formed as shown in FIG. 12B. Further, the insulating layer 36 is removed along the resist 51 and shaped to be the predetermined shape.

Figure 12F:
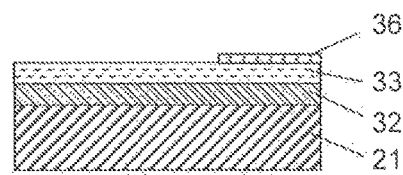

If the milling rate of the insulating layer 36 is smaller than that of the free layer 35 and the spacer layer 34, as shown in FIG. 12F showing a cross section along the line D-D similar to FIG. 12D, the insulating layer 36 may remain. If a post process is conducted where a height difference remains due to the insulating layer 36, the height difference is also generated even in the side shields 37 and the upper shield 22, and the magnetization direction of the upper shield 22 can be rotated from the cross track direction CT. Therefore, at the end of the Tw formation process, as shown in FIG. 12D, it is desirable to completely or sufficiently remove the insulating layer 36. Due to this reason, it is preferable to use $SiO_2$ having a milling rate closer to that of the free layer 35 and the spacer layer 34 (metallic layer) as the insulating layer. However, $SiO_2$ may demonstrate insufficient adhesion with the pinned layer 33 which is located below and is a metal layer, and there is a possibility that it peels from the pinned layer 33. Consequently, the insulating layer 36 can have a two-layer configuration composed of a lower layer of $Al_2O_3$ that has excellent adhesion with a metallic layer, and an upper layer of $SiO_2$ where its milling rate is closer to that of the metallic layer. If the entire insulating layer 36 is formed of $Al_2O_3$, since $Al_2O_3$ is soluble into a developing solution of the resist, it is desirable to cover the $Al_2O_3$ layer with a protective film, such as Ta, Ti or Ru.

After the exposed portions of the free layer 35 and the insulating layer 36 are removed by milling, a protective film is formed on the upper surface of the pinned layer 33 and the side surfaces of the free layer 35 and the space layer 34, and as shown in FIGS. 13A to 13E, the side shields 37 are formed using the sputtering method. FIGS. 13A to 13E are drawings similar to FIGS. 12A to 12E, respectively. Subsequently, the resist 51 is removed with a developing solution, forming the upper shield 22. The situation at this time is shown in FIGS. 14A to 14E. FIGS. 14A to 14E are drawings similar to FIGS. 12A to 12E, respectively.

Subsequently, the recording part 4 is made using a known method, and a wafer is cut off to be separated to individual magnetic slider 1. Subsequently, the magnetic head slider 1 is completed by polishing the ABS.

As explained above, in the present embodiment, MRh is formed, and then, the cross track direction length Tw of the free layer 35 is formed. In other words, the MRh formation, production of the insulating layer 36, Tw formation and production of the side shields 37 are conducted in respective order. In the meantime, when the cross track direction length Tw of the free layer 35 is formed and then MRh is formed, the Tw formation, the production of the side shields 37, the MRh formation and the production of the insulating layer 36 are conducted in respective order. It is necessary to consecutively conduct the Tw formation and the production of the side shields 37, and it is necessary to consecutively conduct the MRh formation and the production of the insulating layer 36, as well. In the case of forming MRh after the formation of Tw, the situation at the moment of completion of the Tw formation and the production of side shields 37 is shown in FIGS. 15A to 15E. Subsequently, the resist 54 is formed, and MRh is formed. The situation at this time is shown in FIGS. 16A to 16E. In the MRh formation process, a portion in the side shields 37 that is not covered by the resist 54 is removed by milling, and then, the insulating layer 36 is formed. Subsequently, the resist 54 is removed and the upper shield 22 is formed. The situation at this time is shown in FIG. 17A to 17E.

Figure 15A:
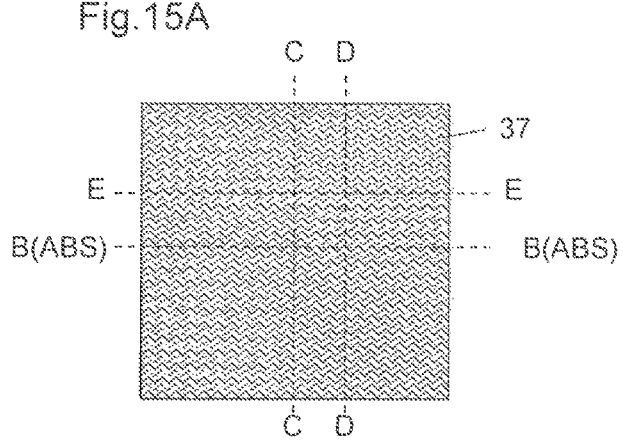
FIGS. 15A to 17E are conceptual views showing the manufacturing process of the MR element in comparative examples.
Figure 15B:
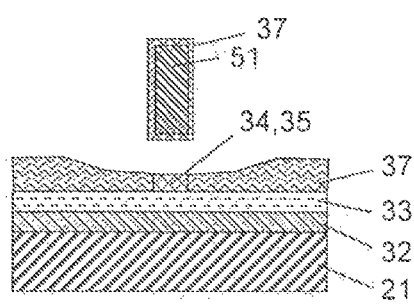
Figure 15C:
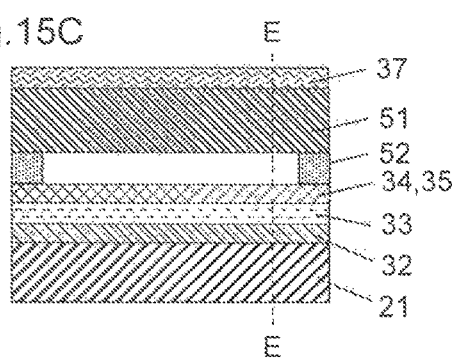
Figure 15D:
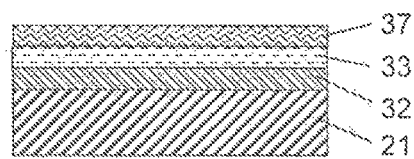
Figure 15E:
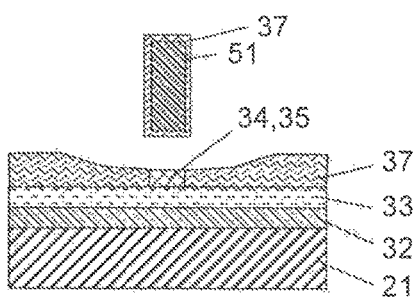
Figure 16A:
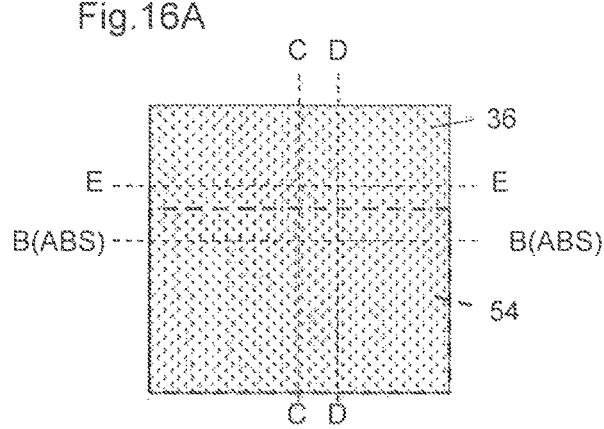
Figure 16B:
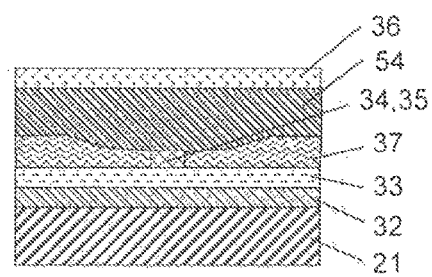
Figure 16C:
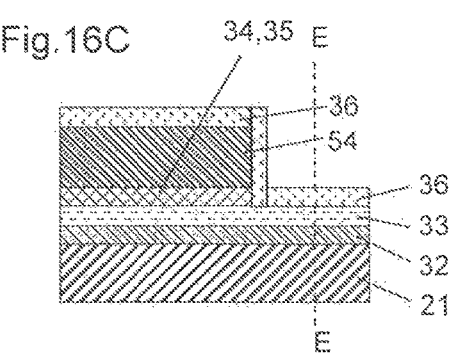
Figure 16D:
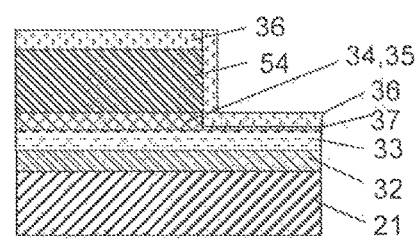
Figure 16E:
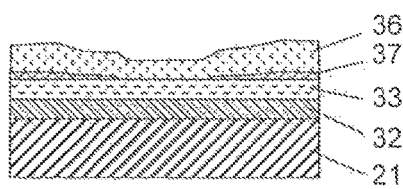
Figure 17A:
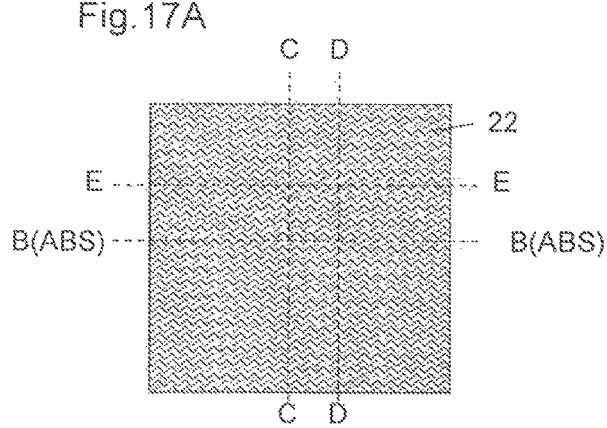
Figure 17B:
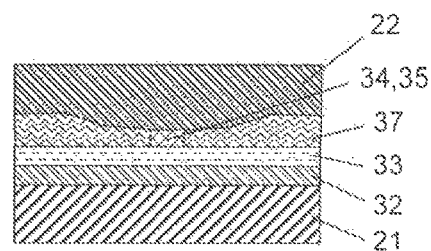
Figure 17C:
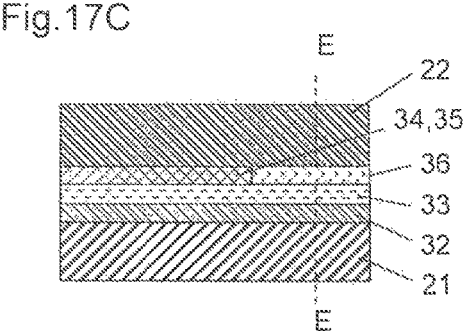
Figure 17D:
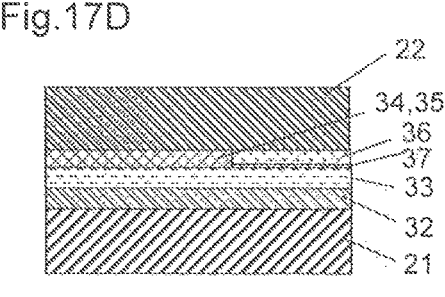
Figure 17E:
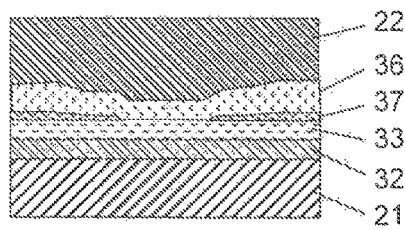

Here, compared between FIG. 14B and FIG. 17B, the side shields 37 contact the upper shield 22 on the ABS. However, compared between FIG. 14E and 17E, the side shields 37 do not contact the upper shield 22 at the recessed side of the free layer 35 viewed from the ABS. In other words, the side shields 37 and the upper shield 22 are divided via the insulating layer 36. This is because, as shown in FIGS. 16D and 16E, the side shields 37 partially remain at the recessed side of the free layer 35. Since the resist 51 functions as a shielding substance in the film formation process of the side shields 37, as shown in FIG. 15E, the side shields 37 are formed higher than the region immediately under the resist 51 at the region away from the resist 51. Further, even on the occasion of milling, the resist 51 becomes a shielding substance, and the side shields 37 are not uniformly removed. Consequently, the portion(s) of the side shields 37 with thicker film thickness will not be removed but remains In the meantime, in the present embodiment, since the insulating layer 36 is formed at first and the side shields 37 and the upper shield 22 are sequentially formed, the side shields 37 and the upper shield 22 will never be divided by the insulating layer 36 in principle. Therefore, the side shields 37 and the upper shields 22 make contact at the side of the insulating layer 36, as well.

(Second Embodiment)

Figure 4:
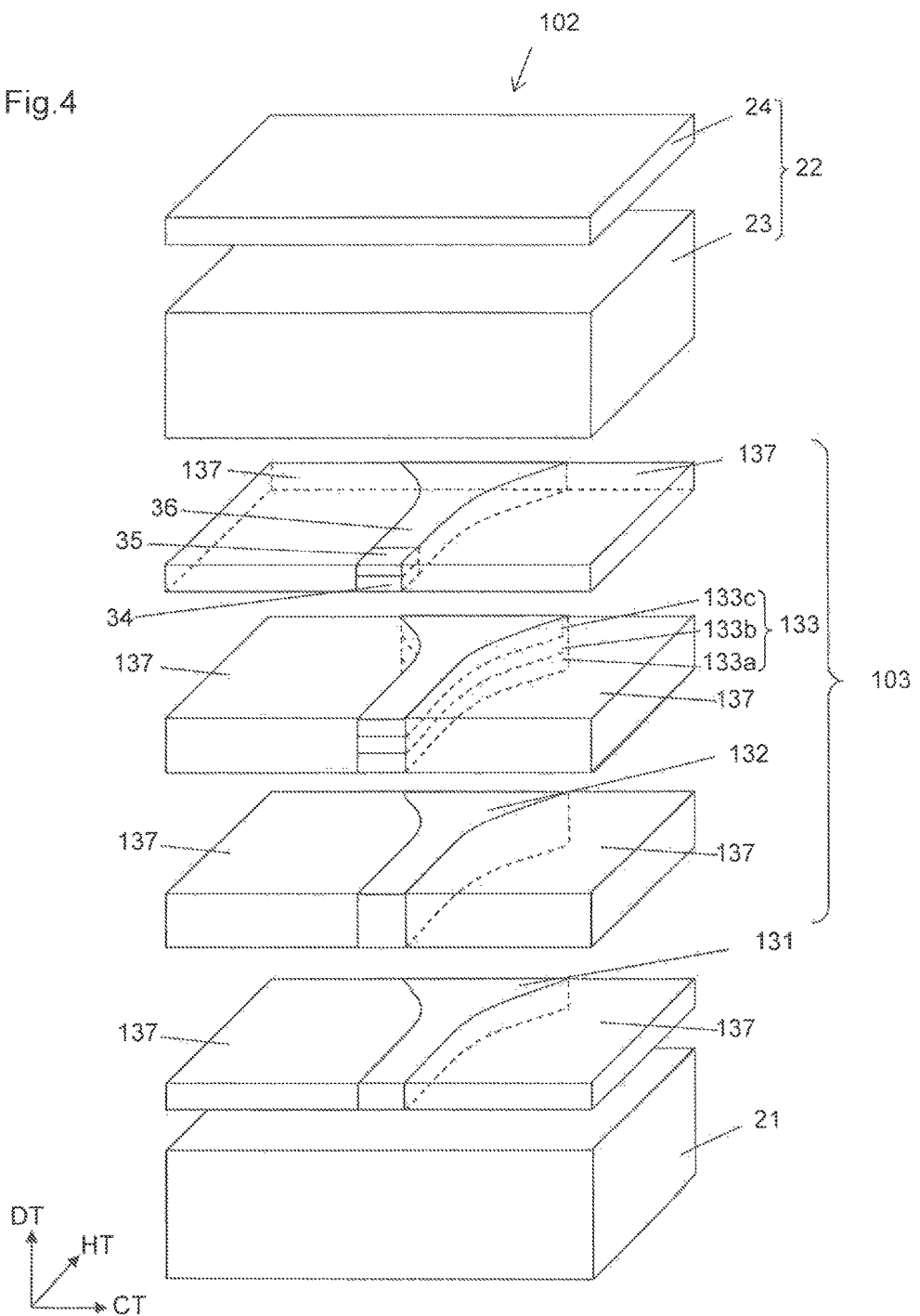
FIG. 4 is a perspective view of the MR element relating to the second embodiment.
Figure 5:
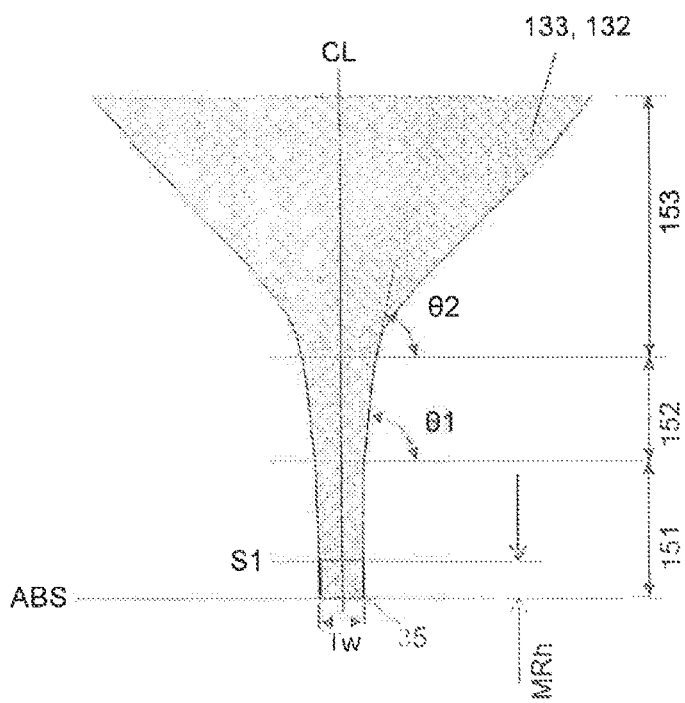
FIG. 5 is a plan view of the pinned layer and the antiferromagnetic layer of the MR element shown in FIG. 4.

The configuration of a magneto-resistive effect element (MR element) 102 relating to the second embodiment is explained hereafter with reference to FIGS. 4 and 5. FIGS. 4 and 5 correspond to FIGS. 2 and 3 of the first embodiment, respectively. Elements marked with the same symbols in the first embodiments are the same as those in the first embodiment. In the present embodiment, the point that side shields 137 also exist at the sides of a pinned layer 133 and an antiferromagnetic layer 132 is different from the first embodiment.

The pinned layer 133 and the antiferromagnetic layer 132 in a multilayer film 103 have a funnel-shaped planar shape that is symmetrically formed relative to a center line CL extending in the height direction HT. The shape of the pinned layer 133 and that of the antiferromagnetic layer 132 are the same. The length of the pinned layer 133 and that of the antiferromagnetic layer 132 in the cross track direction CT are increased toward the height direction HT from the ABS. A seed layer 131 also has the same shape as the pinned layer 133 and the antiferromagnetic layer 132, but it may also be rectangular similar to the first embodiment.

The pinned layer 133 and the antiferromagnetic layer 132 have a first portion 151 facing the ABS, a second portion 152 that is connected to the first portion 151, and that is farther away from the ABS than the first portion 151, and a third portion 153 that is connected to the second portion 152, and that is farther away from the ABS than the second portion 152. The first portion 151, the second portion 152 and the third portion 153 have symmetrical shapes relative to the common center line CL extending in the height direction HT. The cross track direction length of the first portion 151 is consistent in the height direction HT, and is substantially equal to the cross track direction length Tw of the free layer 35. The cross track direction length of the second portion 152 is greater than the cross track direction length Tw of the free layer 35, and is increased as the second portion 152 extends from the ABS. The cross track direction length of the second portion 152 is increased in the first ratio as the second portion 152 extends from the ABS in the height direction HT. The cross track direction length of the third portion 153 is increased in the second ratio, which is greater than the first ratio, as the third portion 153 extends from the ABS. In other words, an inclination angle θ1 of the outer edge of the second portion 152 relative to the cross track direction CT at the boundary between the first portion 151 and the second portion 152 is greater than an inclination angle θ2 of the outer edge of the third portion 153 relative to the cross track direction CT at the boundary between the second portion 152 and the third portion 153.

Since the pinned layer 133 and the antiferromagnetic layer 132 are formed to be greater than the free layer 35 even in the present embodiment, the pinned layer 133 is magnetically solidly coupled with the antiferromagnetic layer 132, and the magnetization direction is stabilized. Therefore, the reversal of the magnetization direction of the pinned layer 133 is difficult to occur.

The free layer 35 and the pinned layer 133 may be arranged upside down in the down track direction DT relative to the space layer 34. Specifically, the free layer 35, the spacer layer 34, an inner pinned layer 133c, an exchange-coupled layer 133b, an outer pinned layer 133a, and the antiferromagnetic layer 132 may be laminated in respective order from the lower shield 21 to the upper shield 22.

The MR element of the present embodiment can be produced substantially similar to that in the first embodiment. However, the lateral part in the cross track direction CT from the free layer 35 to the seed layer 131 is removed in the MRh formation process, and the removed portion is substituted by the side shields 137. Specifically, in FIGS. 12A to 12E, portions up to the antiferromagnetic layer 32 are removed, and an upper surface of the lower shield 21 is exposed. Subsequently, in FIGS. 13A to 13E, the side shields 137 are formed on the upper surface of the lower shield 21 and on the sides of the free layer 35, the spacer layer 34, the pinned layer 33 and the antiferromagnetic layer 32.

Figure 15F:
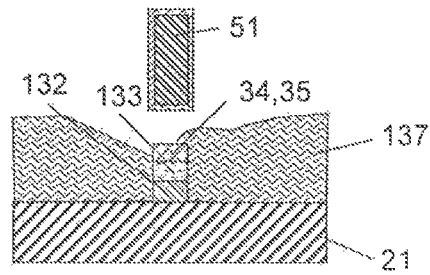

Furthermore, in the film configuration of the present embodiment, when the cross track direction length Tw of the free layer 35 is formed, and then MRh is formed, a portion of the pinned layer 133 is likely to be partially removed due to milling in the MRh formation process. In other words, since many MR elements are formed on the wafer, particles may drop obliquely in the film formation process of the side shield 137 depending upon the position of the MR elements on the wafer. In this case, as shown in FIG. 15F, a phenomena where the side shields 137 are formed so as to cover one end of the apex of the free layer 35, but the side shields would not be sufficiently formed at the other end could happen. In this situation, when the side shields 137 are removed by milling for the purpose of the MRh formation, there is a possibility where a portion of the pinned layer 133 that is not covered with the side shield 137 is trimmed obliquely, thus it adversely affects the characteristics of the MR element. As described above, the formation of the cross track direction length Tw of the free layer 35 after MRh is formed enables avoidance of this problem.

(Third Embodiment)

Figure 6:
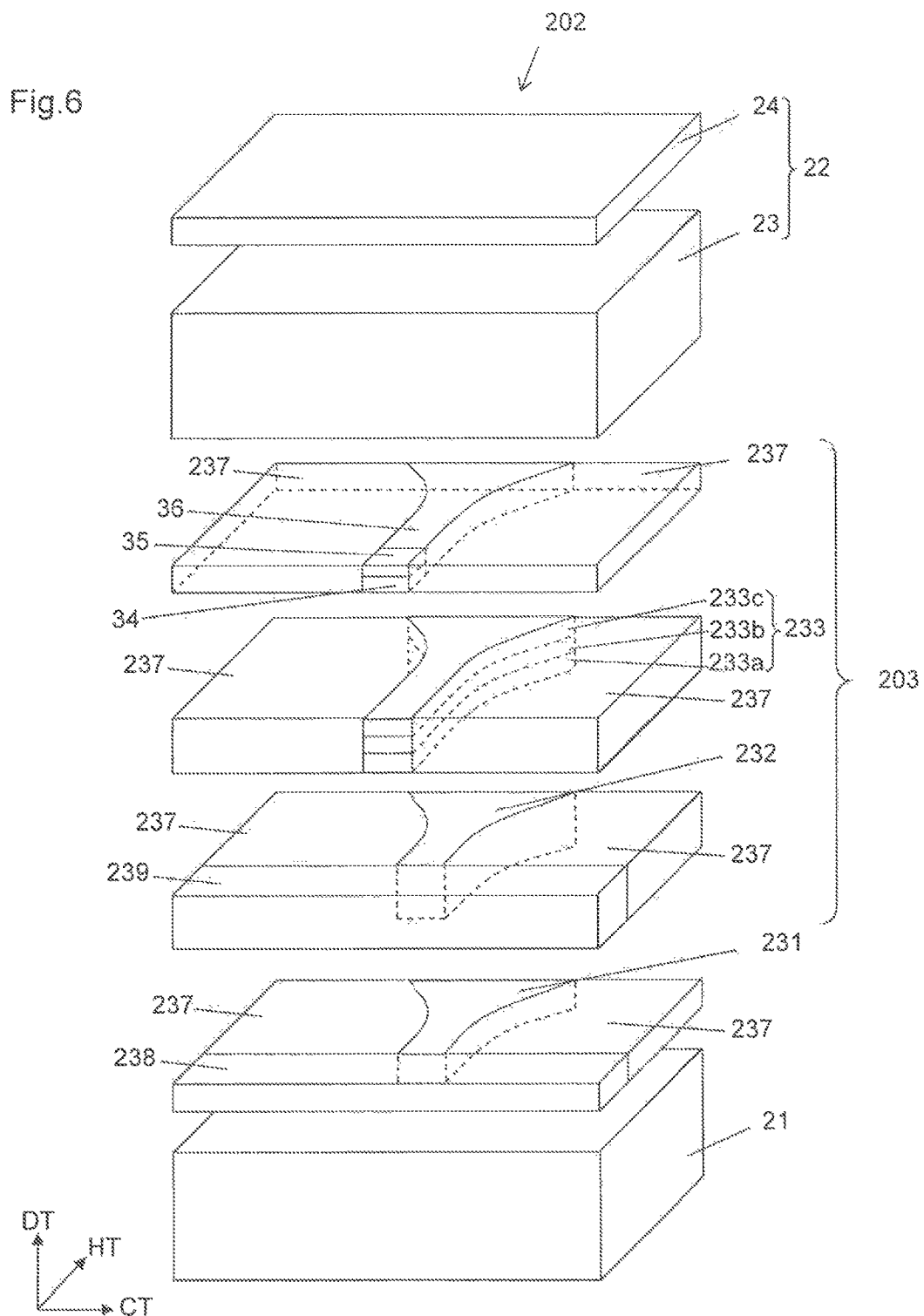
FIG. 6 is a perspective view of the MR element relating to the third embodiment.
Figure 7:
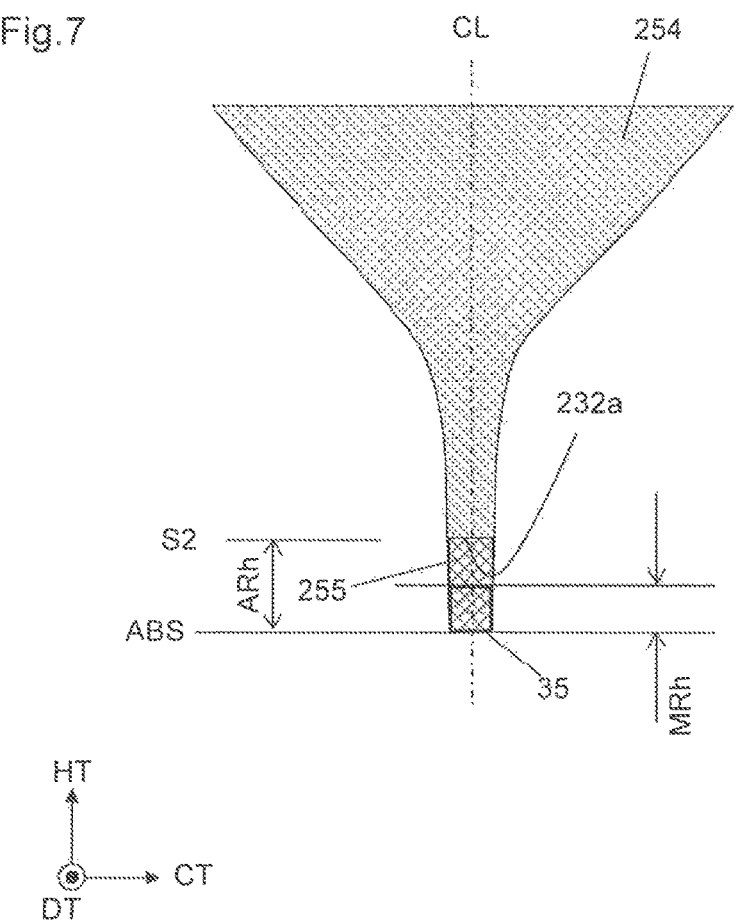
FIG. 7 is a plan view of the pinned layer and the antiferromagnetic layer of the MR element shown in FIG. 6.

With reference to FIGS. 6 and 7, configuration of a magneto-resistive effect element (MR element) 202 relating to the third embodiment is explained. FIGS. 6 and 7 correspond to FIGS. 2 and 3 of the first embodiment, respectively. The present embodiment is the same as the second embodiment except for the point where the antiferromagnetic layer 232 is recessed from the ABS. In FIG. 6, symbol 237 represents side shields. In FIG. 7, a symbol 254 represents a common region of the antiferromagnetic layer 232 and the pinned layer 233, and the symbol 255 represents a region where the pinned layer 233 exists, but the antiferromagnetic layer 232 does not exist. A surface 232a of the antiferromagnetic layer 232 facing the ABS is situated on a second surface S2, which is away from the ABS in the height direction HT by a distance ARh that is greater than the height MRh of the free layer 35 in the height direction HT.

An inner shield 239 is arranged at the ABS side of the recessed antiferromagnetic layer 232. Similarly, the seed layer 231 is also recessed from the ABS, and an inner shield 238 is arranged at the ABS side of a seed layer 231. A not-shown insulating layer is arranged between the antiferromagnetic layer 232 and the inner shield 239, and between the seed layer 231 and the inner shield 238, respectively. The inner shields 238 and 239 are formed of the same material as the lower shield 21 and are integrated with the lower shield 21. The inner shields 238 and 239 function as a part of the lower shield 21. Therefore, a read gap of the MR element 202 is determined by the upper shield 22 and the inner shield 239, and magnetic data recorded with high density on a magnetic recording medium M can be read. Further, IrMn configuring the antiferromagnetic layer 232 is easily deteriorated by heat, and, the vicinity of the ABS tends to be high temperature because a sense current flows. Since the antiferromagnetic layer 232 in the present embodiment is retracted from the ABS, it is difficult to be exposed to high temperature due to the current. Further, if the antiferromagnetic layer 232 faces the ABS, it tends to be corroded. Since the antiferromagnetic layer 232 in the present embodiment is protected by the inner shield 238, the reliability of the MR elements is enhanced.

The present embodiment can be made similar to the first and second embodiments. The inner shields 238 and 239 can be made using a known general technique. For example, the antiferromagnetic layer 232 and the seed layer 231 are formed, and these layers 231 and 232 at the ABS side are partially removed by a photoresist and milling, soft magnetic layers to be the inner shields 238 and 239 are formed and the photoresist is removed.

(Fourth Embodiment)

Figure 8:
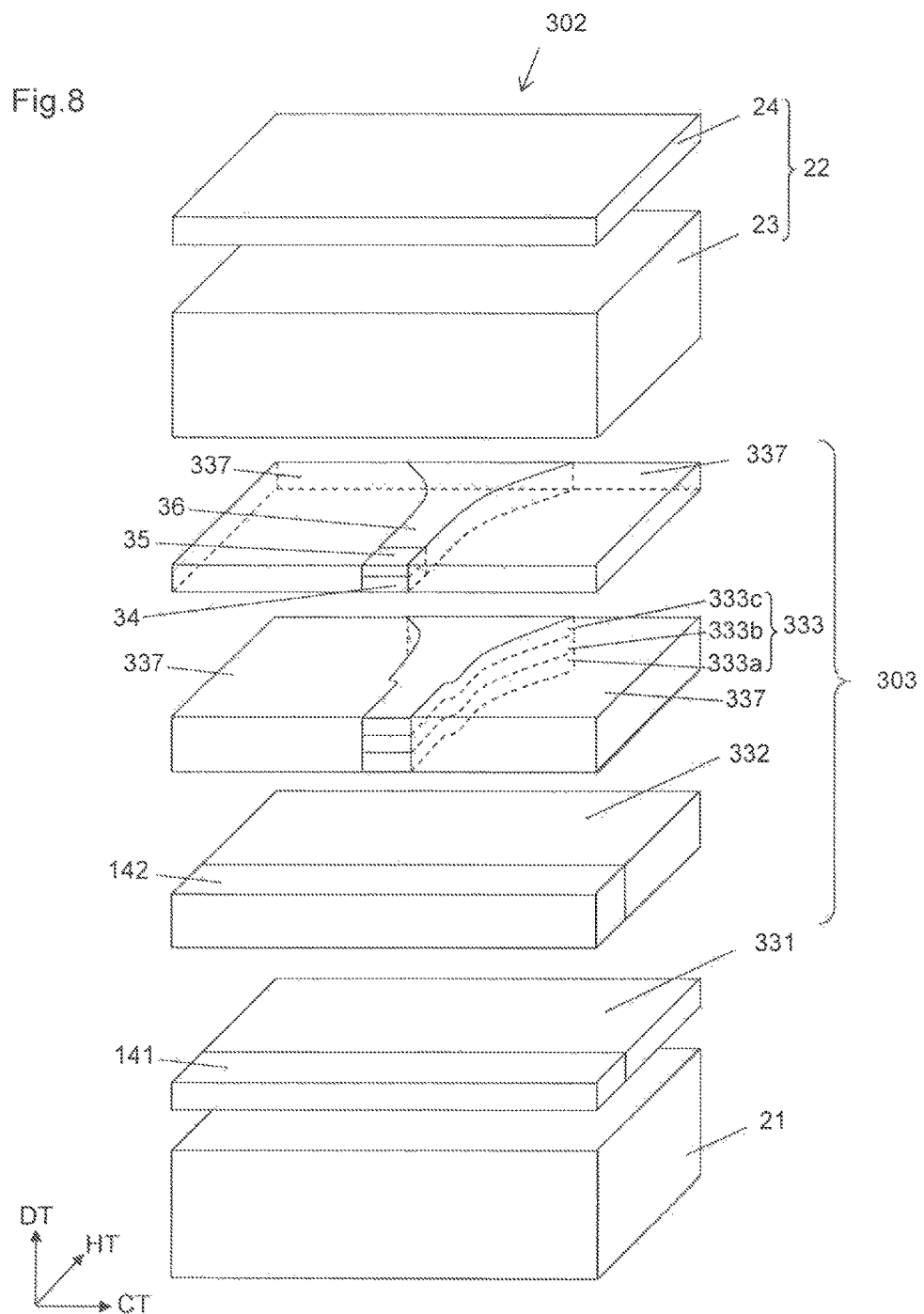
FIG. 8 is a perspective view of the MR element relating to the fourth embodiment.
Figure 9:
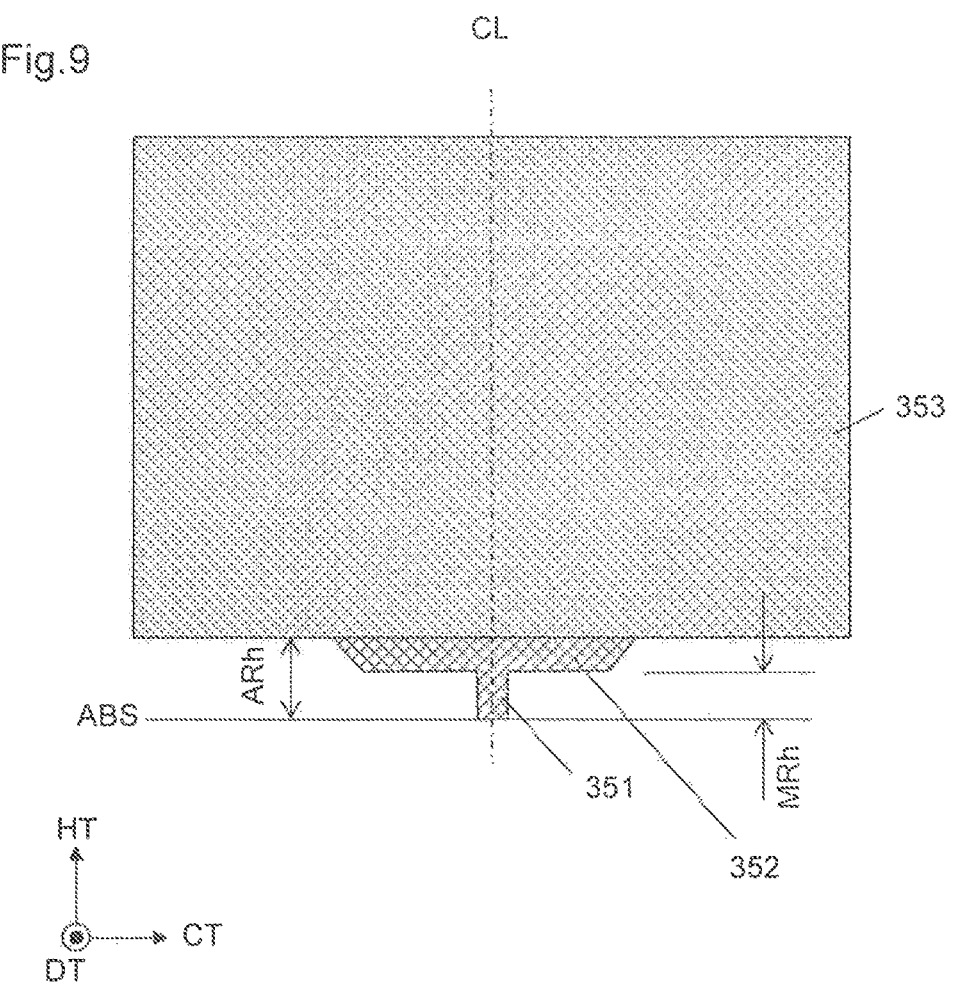
FIG. 9 is a plan view of the pinned layer and the antiferromagnetic layer of the MR element shown in FIG. 8.

A configuration of the magneto-resistive effect element (MR element) 303 relating to the fourth embodiment is explained hereafter with reference to FIGS. 8 and 9. FIGS. 8 and 9 correspond to FIGS. 2 and 3 of the first embodiment, respectively. The present embodiment is the same as the third embodiment except for the point where the shape of the pinned layer 333 is different. An antiferromagnetic layer 332 is recessed from the ABS. The pinned layer 333 has a first portion 351 extending from the ABS to the first surface, a second portion 352 extending from the first surface to the second surface, and a third portion 353 extending from the second surface in a direction away from the ABS, and the width in the cross track direction CT is increased in the first portion 351, the second portion 352 and the third portion 353 in respective order. The antiferromagnetic layer 332 has only the third portion 353. In FIG. 8, symbol 337 represents side shields.

Figure 18A:
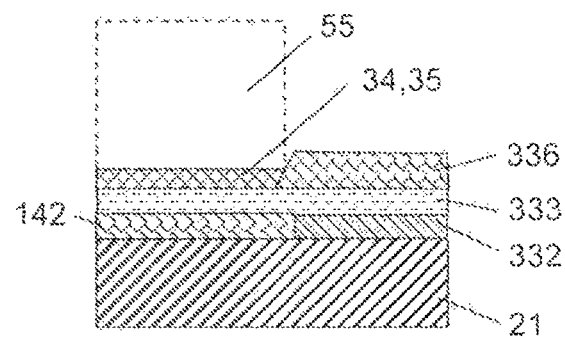
FIGS. 18A to 18B are conceptual views showing the manufacturing process of the MR element relating to the fourth embodiment.
Figure 18B:
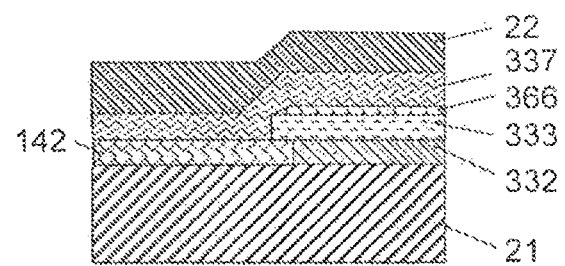

The pinned layer 333 with such shape can be formed as mentioned below. FIGS. 18A and 18B are cross-sectional views along the line D-D in FIG. 11A similar to FIG. 11B. On the occasion of the MRh formation process, as shown in FIG. 18A, a portion of the free layer 35 and the spacer layer 34 that is not covered with the resist 55 is removed, and consequently, an insulating layer 336 is formed. On this occasion, the insulating layer 336 is formed so as to have thickness enough to remain in the Tw formation process. As a result, on the cross-section D-D, while the pinned layers 133 and 233 happen to be removed in the second and third embodiments, the pinned layer 333 protected by the insulating layer 366 remains at the back side of the MRh as shown in FIG. 18B in the present embodiment.

(Head Gimbal Assembly (HGA), Recording Apparatus)

Figure 19:
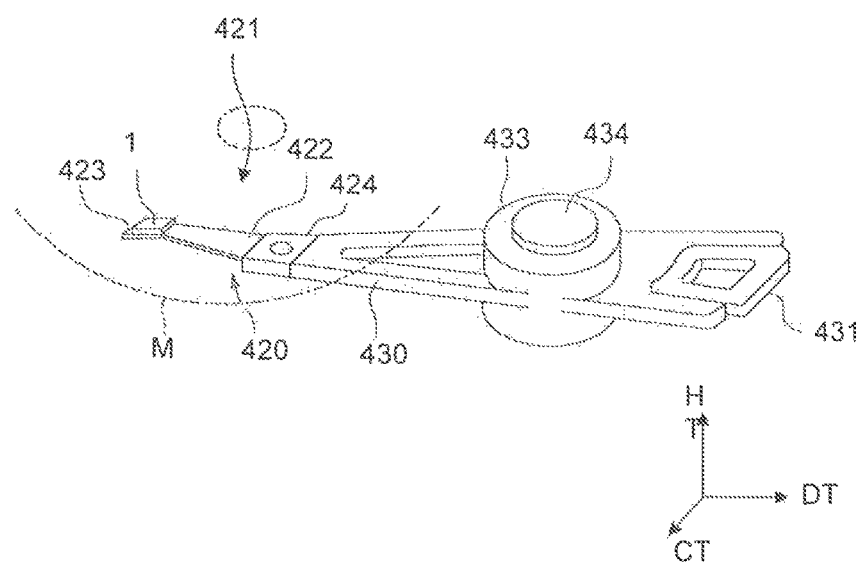
FIG. 19 is a perspective view of a head arm assembly of the present invention.

FIG. 19 is a perspective view of a head gimbal assembly (HGA) 421. The HGA 421 is provided with the magnetic head slider 1 where the MR 2, 102, 202 or 302 is mounted, and a suspension 420 that elastically supports the magnetic head slider 1. The suspension 420 has a plate-spring-state load beam 422 formed of stainless steel, a flexure 423 disposed at one end of the load beam 422, and a base plate 424 disposed at the other end of the load beam 422. The magnetic head slider 1 is joined to the flexure 423, and an adequate degree of freedom is provided by the flexure 423. A gimbal part (not shown) for maintaining a constant posture of the magnetic head slider 1 is placed in a portion in the flexure 423 where the magnetic head slider 1 is mounted.

The HGA 421 is mounted in an arm 430. The arm 430 moves the magnetic head slider 1 to the cross track direction CT. A base plate 424 is mounted at one end of the arm 430. A coil 431 to be a part of a voice coil motor is mounted at the other end of the arm 430. A bearing 433 is disposed in the intermediate part of the arm 430. The arm 430 is supported to be rotatable by a shaft 434 mounted to the bearing 433. The arm 430 and the voice coil motor driving the arm 430 configure an actuator.

Figure 20:
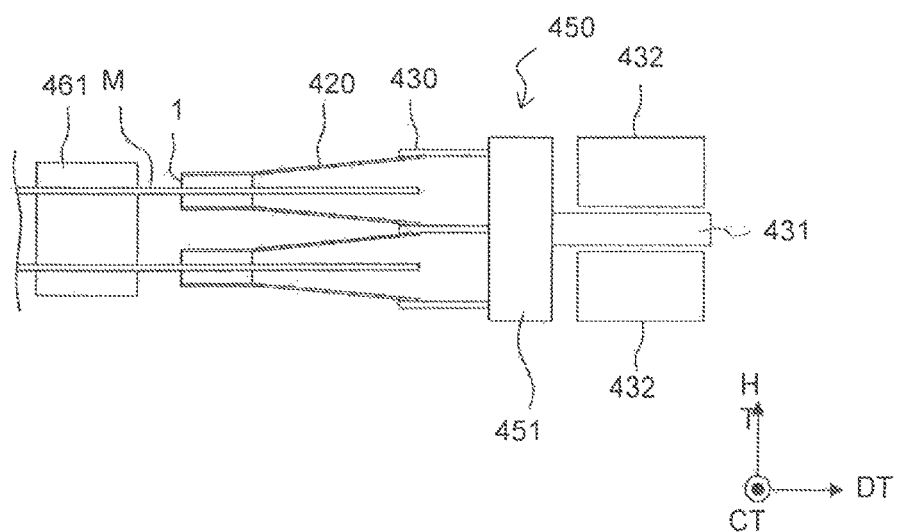
FIG. 20 is a side view of the head stack assembly of the present invention.

FIG. 20 is a side view of a head stack assembly 450. The head stack assembly 450 has a carriage 451 having a plurality of arms 430 and HGAs 421 mounted to the arms 430, respectively. The HGAs 421 are mounted to the arms 430 so as to align at intervals from each other in the height direction HT. A pair of permanent magnets 432 are arranged at opposite positions across the coil 431.

Figure 21:
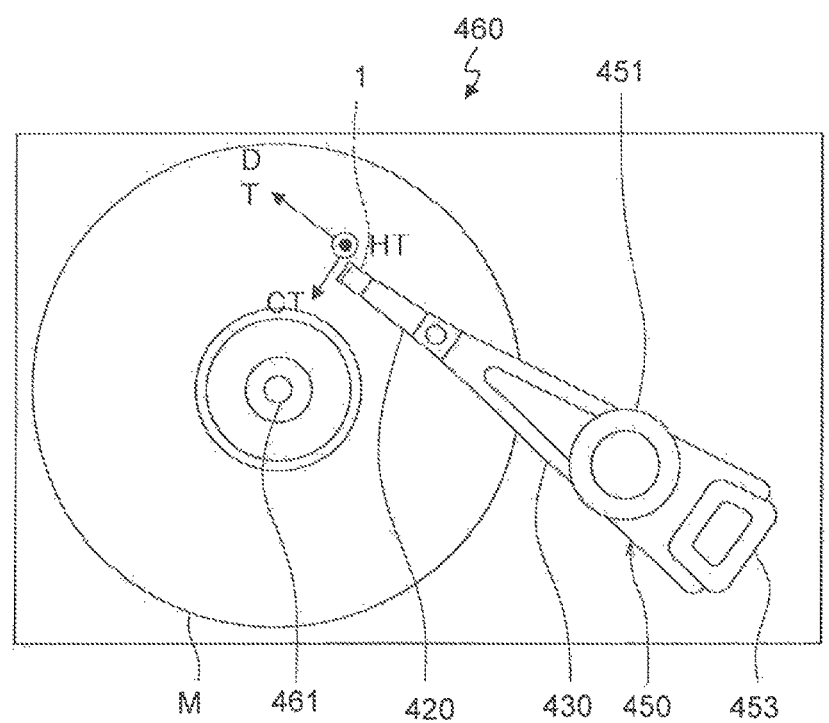
FIG. 21 is a plan view of a magnetic recording apparatus.

FIG. 21 is a plan view of a magnetic recording apparatus. A head stack assembly 450 is incorporated into a magnetic recording apparatus 460. The magnetic recording apparatus 460 has a plurality of magnetic recording media M mounted to a spindle motor 461. Two magnetic head sliders 1 opposing across the magnetic recording medium M are arranged per magnetic recording medium M. The head stack assembly 450 except for the magnetic head slider 1 and the actuator configure a positioning device, support the magnetic head slider 1, and position the magnetic head slider 1 relative to the magnetic recording media. The magnetic head slider 1 is moved in the cross track direction CT of the magnetic recording media M by the actuator and is positioned relative to the magnetic recording media M. The magnetic head slider 1 records information to the magnetic recording media M by a magnetic recording element and reproduces information recorded in the magnetic record media M by the MR element 2, 102, 202 or 302.

The desired embodiments of the present invention were presented and explained in detail, but it should be understood that it is possible to variously change and modify them unless departing from a general meaning or a scope of attached claims

What is claimed is:

1. A magneto-resistive effect element, comprising:
    an upper shield that is magnetized in a cross track direction,
    a lower shield that is positioned at an interval in a down track direction relative to the upper shield; and
    a multilayer film that is positioned between the upper shield and the lower shield, and that faces an air bearing surface (ABS), wherein
    the multilayer film comprises:
 a free layer having a magnetization direction that fluctuates against an external magnetic field,
 a pinned layer having a magnetization direction that is pinned against the external magnetic field,
 a nonmagnetic spacer layer that is positioned between the free layer and the pinned layer, and
 an insulating layer that is positioned at a back side of the free layer viewed from the ABS; and
    the magneto-resistive effect element further comprises a pair of side shields that are positioned on both sides of the free layer and the insulating layer in the cross track direction, and that include soft magnetic layers, wherein
    the soft magnetic layers of the side shields contact the upper shield on the sides of the free layer and the insulating layer in the cross track direction,
    the multilayer film comprises an antiferromagnetic layer that pins a magnetization of the pinned layer,
    the pinned layer and the antiferromagnetic layer extend in a height direction beyond a first surface, which is away from the ABS in the height direction, by a distance that is equal to a height of the free layer in the height direction, and
    at least a portion of the pinned layer and at least a portion of the antiferromagnetic layer have greater length than the free layer in the cross track direction, respectively.

2. A magneto-resistive effect element, comprising:
    an upper shield that is magnetized in a cross track direction,
    a lower shield that is positioned at an interval in a down track direction relative to the upper shield; and
    a multilayer film that is positioned between the upper shield and the lower shield, and that faces an air bearing surface (ABS), wherein
    the multilayer film comprises:
 a free layer having a magnetization direction that fluctuates against an external magnetic field,
 a pinned layer having a magnetization direction that is pinned against the external magnetic field,
 a nonmagnetic spacer layer that is positioned between the free layer and the pinned layer, and
 an insulating layer that is positioned at a back side of the free layer viewed from the ABS; and
    the magneto-resistive effect element further comprises a pair of aide shields that are positioned on both sides of the free layer and the insulating layer in the cross track direction, and that include soft magnetic layers, wherein the soft magnetic layers of the side shields contact the upper shield on the sides of the free layer and the insulating layer in the cross track direction, the multilayer film comprises an antiferromagnetic layer that pins a magnetization of the pinned layer, the pinned layer and the antiferromagnetic layer extend in a height direction beyond a first surface, which is away from the ABS in the height direction, by a distance that is equal to a height of the free layer in the height direction, and lengths of the pinned layer and the antiferromagnetic layer in the cross track direction are increased as the pinned layer and the antiferromagnetic layer extend from the ABS in the height direction, respectively.

3. A magneto-resistive effect element, comprising:
an upper shield that is magnetized in a cross track direction,
a lower shield that is positioned at an interval in a down track direction relative to the upper shield; and
a multilayer film that is positioned between the upper shield and the lower shield, and that faces an air bearing surface (ABS), wherein
the multilayer film comprises:
a free layer having a magnetization direction that fluctuates against an external magnetic field,
a pinned layer having a magnetization direction that is pinned against the external magnetic field,
a nonmagnetic spacer layer that is positioned between the free layer and the pinned layer, and
an insulating layer that is positioned at a back side of the free layer viewed from the ABS; and
the magneto-resistive effect element further comprises a pair of aide shields that are positioned on both sides of the free layer and the insulating layer in the cross track direction, and that include soft magnetic layers, wherein
the soft magnetic layers of the side shields contact the upper shield on the sides of the free layer and the insulating layer in the cross track direction,
the multilayer film comprises an antiferromagnetic layer that pins a magnetization of the pinned layer,
the pinned layer and the antiferromagnetic layer extend in a height direction beyond a first surface, which is away from the ABS in the height direction, by a distance that is equal to a height of the free layer in the height direction,
the pinned layer and the antiferromagnetic layer comprise:
a first portion that faces the ABS,
a second portion that is connected to the first portion, and that is farther away from the ABS than the first portion, and
a third portion that is connected to the second portion, and that is farther away from the ABS than the second portion;
a length of the first portion in the cross track direction is constant in the height direction, a length of the second portion in the cross track direction is increased at a first ratio as the second portion extends from the ABS in the height direction, and a length of the third portion in the cross track direction is increased at a second ratio, which is greater than the first ratio, as the third portion extends from the ABS in the height direction.

4. The magneto-resistive effect element according to claim 3, wherein the first portion, the second portion and the third portion define a common center line extending in the height direction and symmetrical shapes relative to the center line; and an inclination angle of the external edge of the second portion in the cross track direction at a boundary of the first portion and the second portion is greater than an inclination angle of the external edge of the third portion relative to the cross track direction at a boundary of the second portion and the third portion.

5. A magneto-resistive effect element, comprising:
an upper shield that is magnetized in a cross track direction,
a lower shield that is positioned at an interval in a down track direction relative to the upper shield; and
a multilayer film that is positioned between the upper shield and the lower shield, and that faces an air bearing surface (ABS), wherein
the multilayer film comprises:
a free layer having a magnetization direction that fluctuates against an external magnetic field,
a pinned layer having a magnetization direction that is pinned against the external magnetic field,
a nonmagnetic spacer layer that is positioned between the free layer and the pinned layer, and
an insulating layer that is positioned at a back side of the free layer viewed from the ABS; and
the magneto-resistive effect element further comprises a pair of aide shields that are positioned on both sides of the free layer and the insulating layer in the cross track direction, and that include soft magnetic layers, wherein
the soft magnetic layers of the side shields contact the upper shield on the sides of the free layer and the insulating layer in the cross track direction,
the multilayer film comprises an antiferromagnetic layer that pins a magnetization of the pinned layer,
the pinned layer and the antiferromagnetic layer extend in a height direction beyond a first surface, which is away from the ABS in the height direction, by a distance that is equal to a height of the free layer in the height direction, and
the pinned layer and the antiferromagnetic layer comprise a greater length in the cross track direction and the height direction than that of the free layer, respectively.

6. The magneto-resistive effect element according to claim 5, wherein the pinned layer and the antiferromagnetic layer comprise the same rectangular shape within a plane determined with the cross track direction and the height direction.

7. A magneto-resistive effect element, comprising:
an upper shield that is magnetized in a cross track direction,
a lower shield that is positioned at an interval in a down track direction relative to the upper shield; and
a multilayer film that is positioned between the upper shield and the lower shield, and that faces an air bearing surface (ABS), wherein
the multilayer film comprises:
a free layer having a magnetization direction that fluctuates against an external magnetic field,
a pinned layer having a magnetization direction that is pinned against the external magnetic field,
a nonmagnetic spacer layer that is positioned between the free layer and the pinned layer, and
an insulating layer that is positioned at a back side of the free layer viewed from the ABS; and the magneto-resistive effect element further comprises a pair of aide shields that are positioned on both sides of the free layer and the insulating layer in the cross track direction, and that include soft magnetic layers, wherein the soft magnetic layers of the side shields contact the upper shield on the sides of the free layer and the insulating layer in the cross track direction, the multilayer film comprises an antiferromagnetic layer that pins a magnetization of the pinned layer, the pinned layer and the antiferromagnetic layer extend in a height direction beyond a first surface, which is away from the ABS in the height direction, by a distance that is equal to a height of the free layer in the height direction, a surface of the antiferromagnetic layer facing the ABS is on a second surface that is away from the ABS in the height direction by a distance that is greater than the height of the free layer in the height direction;

the pinned layer comprises:

a first portion that extends to the first surface from the ABS, a second portion that extends from the first surface to the second surface, and a third portion that extends from the second surface in a direction away from the ABS;

a width in the cross track direction is increased, in order, of the first portion, the second portion and the third portion.

\* \* \* \* \*